Nov. 20, 1934.   H. H. SEMMES   1,981,474
AUTOMATIC BRAKE TESTER
Filed Aug. 25, 1930   2 Sheets-Sheet 1
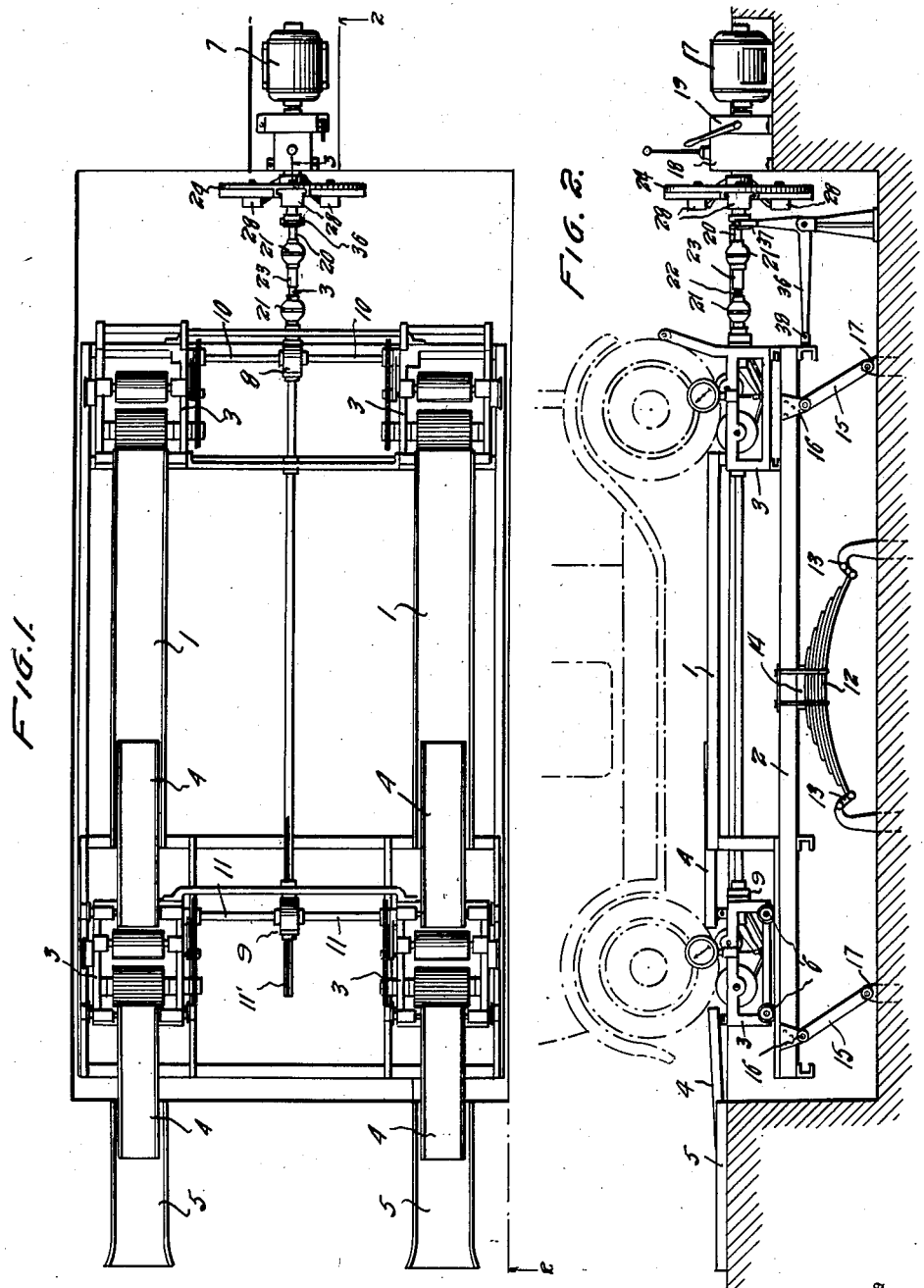
Inventor
HARRY H. SEMMES
By Semmes & Semmes
M. W. McCuskey
Attorney

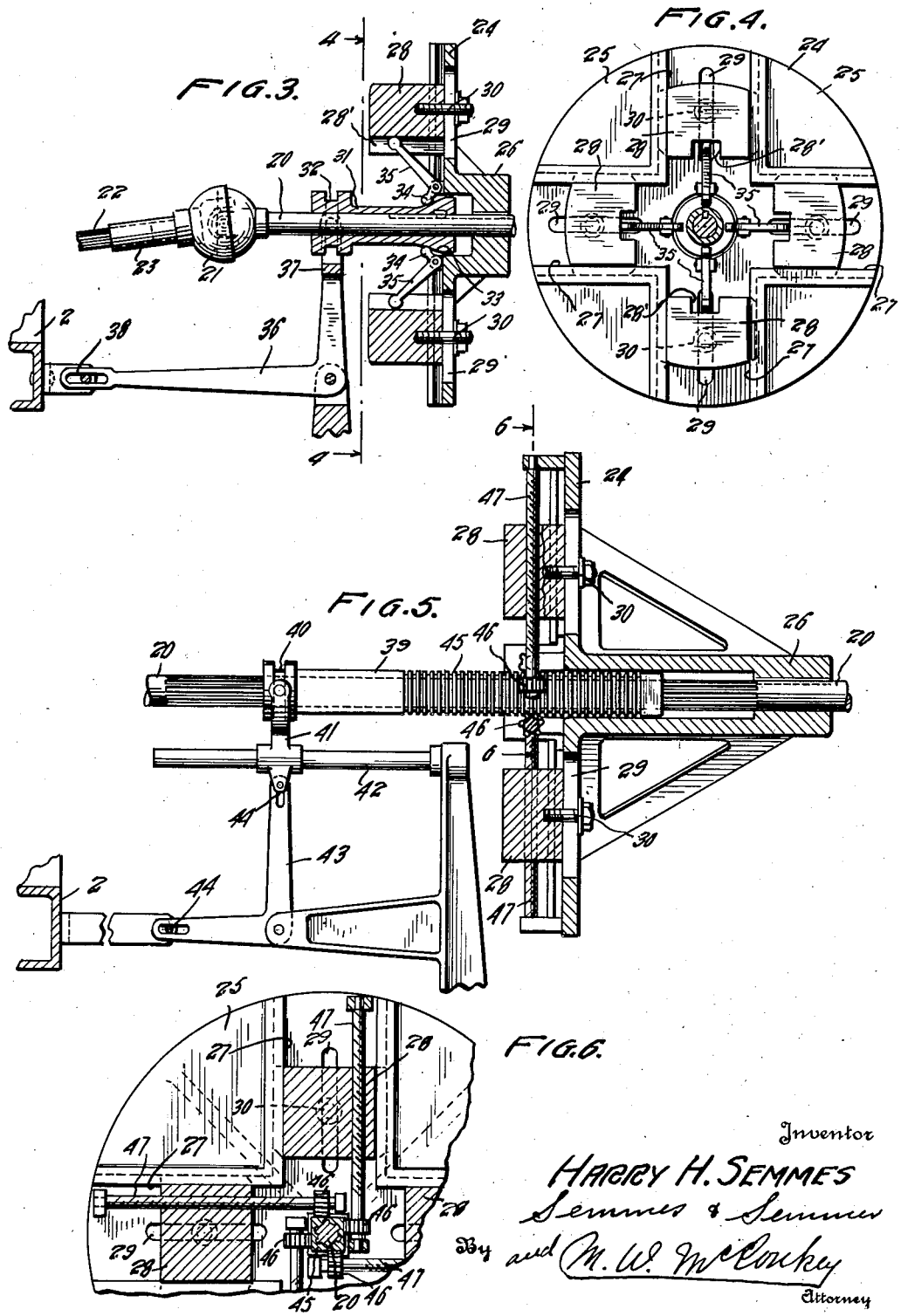

Patented Nov. 20, 1934

1,981,474

UNITED STATES PATENT OFFICE 1,981,474

AUTOMATIC BRAKE TESTER

Harry H. Semmes, Chevy Chase, Md., assignor to Bendix-Cowdrey Brake Tester, Inc., New York, N. Y., a corporation of Delaware Application August 25, 1930, Serial No. 477,715

7 Claims. (Cl. 73—51)

This invention relates to brake testing devices and more particularly to a brake tester in which the momentum factor of the vehicle is automatically simulated.

In the usual apparatus for testing vehicle brakes the vehicle is run upon a structure and the wheels of the vehicle are rotated against the resistance of its brake. In these circumstances the brake structure actually retards only the wheel which is undergoing test.

When the brakes are applied to a vehicle moving on a road, on the other hand, the brakes retard the speed of a moving body whose momentum is greatly in excess of that of the momentum of a rotating wheel considered alone.

In my prior application Serial No. 340,965, there is described a brake testing apparatus and method in which the momentum or inertia of the moving vehicle is simulated by interposing a heavy fly wheel in a drive connection to the wheel driving means, the inertia of which wheel is varied so that the total momentum of a car may be closely approximated.

The present application is a continuation in part of the prior application and relates to an apparatus for brake testing in which the momentum of the driving mechanism against which the brake operates, is automatically adjusted by the car which is to be tested.

A major object of the present invention, therefore, is to provide a novel apparatus for testing brakes on automotive vehicles.

Another object is to provide an apparatus for testing brakes in which the weight of the vehicle to be braked is utilized to automatically simulate the actual conditions encountered in retarding vehicles when in motion.

With these and other objects in view, the invention comprehends the broad concept of automatically simulating the momentum of a moving vehicle in the brake testing structure.

In order to provide a ready comprehension of the invention, illustrative embodiments of it are shown in the accompanying drawings, in which Figure 1 is a plan view of a brake testing unit;

Figure 2 is a side elevation thereof;

Figure 3 is an enlarged detail of the adjusting mechanism;

Figure 4 is a section taken on line 4—4 of Figure 3;

Figure 5 is an enlarged detail of a modified form of the adjusting mechanism; and Figure 6 is a section taken on line 6—6 of Figure 5.

When a vehicle is braked or retarded, the energy which must be absorbed to effect the retardation is a function of the mass or weight of the car and the velocity at which it is moving. According to the present structure, the momentum of the car is simulated by increasing the inertia in the elements upon which the vehicle brake operates. To render the brake testing expeditious, this adjustment is made automatic.

To exemplify the principles herein involved, a physical embodiment is shown in the drawings. In its general construction, the present device is similar to that described in my prior application Serial No. 340,965. The apparatus may comprise a pair of stationary tracks 1 which are mounted upon a suitable frame structure 2. Positioned at each end of the tracks are a series of brake testing units 3 which are employed in a manner well known, to rotate the wheels of the vehicle against the resistance of their brakes. The rear brake testing units are provided with pivoted track-ways 4 which nest within the track or ramps 5 and the fixed track 1.

The rear testing units preferably are movable longitudinally of the vehicle by mounting upon the rollers 6. The purpose of mounting these units for longitudinal displacement is to provide for the accommodation of vehicles of different wheel base lengths. Each testing unit comprises a plurality of wheel driving rollers which contact with the vehicle wheel as shown in Figure 2. These rollers are operated from a single source of power designated by the motor 7. This motor is connected through a suitable transmission to the differentials 8 and 9 and thence through the shafting 10 and 11' to the front and rear testing units respectively. The splined connection 11 permits longitudinal displacement of the rear driving units without interfering with the driving mechanism.

As noted hereinbefore, the purpose of the present invention is to automatically simulate the momentum of the vehicle when in actual operation upon the road. In order to accomplish this, the weight of the vehicle itself is employed to effect displacement of certain elements which may be connected to a suitable part of the driving mechanism of the wheel rollers, so as to increase the inertia of the rollers against which the vehicle wheels operate. This displacement may be obtained in any desired degree of proportionality to the weight of the vehicle so as to effect automatic variation in the inertia of the driving rollers.

With this concept in view, it will be appreciated that a relatively wide range of specific devices may be employed. That to be hereinafter described is given merely as an example of how the above stated principle may be effectuated.

As shown in Figure 2, the entire carriage or support upon which the testing units are mounted and which receives the vehicle, is itself mounted in such a manner as to permit physical displacement. This may be accomplished, as shown, by mounting the frame member, or members 2, upon leaf springs 12 pivoted at their ends to the shackles 13 at the mid-section attached through the saddle construction 14 to the frame. Guiding members 15 may be attached to the frame 2 at any suitable points so as to maintain the carriage in horizontal position. These members are shown as links pivoted respectively to the frame through the lug connection 16 and to a lug 17 fixed or attached to the base.

It will be observed that if a weight is placed upon the carriage which is sufficient to overcome the strength of the spring 12, this spring will be extended and the frame will be displaced downwardly in proportion to the imposed weight.

In order to effect testing of the brakes, the rollers 3 are adapted to be driven by a source of power against the resistance of the respective brakes. The inertia in the driving connection is varied by utilizing the downward displacement of the carriage. In order to accomplish these functions, the motor 7 is connected through a suitable speed change gearing 18 and clutch 19 to the driving shaft 20. This driving shaft is provided with the universal joints 21 and the telescopic shaft sections 22 and 23 so as to provide for angular and longitudinal displacement of the carriage (and the rear rotating rollers) with respect to the motor and associated parts. The shaft section 22 is connected to the shafting members 10 and 11 to rotate the rollers.

Associated with the motor shaft 20 is an inertia body illustrated in the drawings as the fly wheel 24. This may be of any desired weight and dimensions to give the desired effect.

In the type of inertia means shown in Figures 3 and 4, the means includes the fixed heavy masses 25 which may be, say, metal sections integral with the vehicle. The wheel is formed with the hub 26 which is keyed or otherwise secured to the shaft 20. The wheel is formed with the radial grooves 27 within which are mounted for radial movement the displaceable weights 28. The respective contiguous parts of the wheel and the weights are suitably grooved so as to provide for sliding connection. Formed at properly positioned sections of the wheel are the grooves 29. These are adapted to receive the locking members 30 which, for simplicity, have been shown as a bolt and nut construction. These coact at one end with the masses 28 and at the other with the wheel so as to lock the masses at any given radial position with respect to the wheel.

Loosely mounted upon the shaft 20 is a grooved sleeve 31 formed at one end with the groove 32 and at the other with a cam face 33. The cam face is adapted to coact with the short arms 34 of the bell crank levers 35. The other arms of the bell crank levers abut the bottom portion of each of the weights 28. The weights 28 are preferably formed with grooves 28' for receiving and holding the bell crank arms in proper position. The ends of the bell crank may be provided with anti-friction means (not shown).

It will be seen thus far that if the locking means 30 are loosened and the sleeve 31 is displaced longitudinally of the shaft, the bell cranks 35 will act upon the weights to move these radially outwardly. After a predetermined outward movement of the weights 28, these may be locked in the ultimate position by proper manipulation of the locking means 30. If the weights 28 are moved outwardly, the inertia of the fly wheel is correspondingly increased and the force required to retard speed of the shaft 28 correspondingly increases. When the weights and degrees of movement of the masses 28 are properly chosen, the momentum of the vehicle to be tested may be simulated inasmuch as the factors of mass and speed of the shaft may be varied so as to approximate the product involving the factors of the mass and speed of the car.

This variation in the inertia of the driving means is, as will now be appreciated, effected by the displacement of the vehicle carriage. As shown in Figure 3, this is accomplished by providing the pivoted bell crank lever 36 with a yoke 37 which is received within the groove 32. The other end of the bell crank lever is connected through the lost motion connection 38 to the frame 2.

It will be observed now that when a vehicle is run upon the carriage, the entire carriage will be displaced downwardly to a degree directly proportional to the weight of the car. This downward displacement of the carriage effects a corresponding downward movement of the end 38 of the bell crank and due to the mechanical connection, moves the grooved sleeve outwardly to cause radial outward movement of the weight 28.

After the parts have come to a position of rest, the nuts on the locking means 30 may be tightened to lock masses 28 with respect to the inertia wheel. During this displacement operation any angular and longitudinal movement of the carriage with respect to the shaft 20 is permitted by the universal joints 21 and the telescopic shaft 22—23. After this automatic adjustment of the inertia of the driving means, with respect to the mass of the car, the motor may be operated to drive through the inertia wheel and shafting 20 so as to effect rotation of the wheel driving means. The wheel driving means, as noted hereinbefore, are adapted to rotate the wheels of the vehicle against the resistance of the brake. The brakes on a vehicle wheel therefore operate to oppose a force which has been approximated to that force which would be obtained when the vehicle is operating upon the road under a given assumed speed.

As indicated in my prior application, the wheels of the vehicle may be rotated against their brake resistance to obtain the individual effectiveness of their brake. Thereafter, the inertia means may be speeded up to simulate road speed, and then, by applying brakes to all the vehicle wheels and throwing out clutch 19, the effectiveness of the entire braking system may be obtained by counting the revolutions of the wheels before they come to rest. This result is readily convertible into linear feet of stopping distance at the speed used. If desired, a mechanical counter of any well known type may be used.

It will be appreciated from the description hereinbefore given that a number of specific apparatuses may be devised to accomplish the stated results. In order to indicate the breadth of the principle, another particular form of mechanism is shown. In this structure, in lieu of the bell crank displacement means, a screw means is employed.

As shown in Figures 5 and 6 this adjustment mechanism may comprise the shaft 20 which is connected at its driving end to universal joints and telescopic shafting connections as in the previously described devices. This shaft is provided with a sleeve 39 splined upon the shaft 20. At one end, the sleeve is formed with a groove 40 which coacts with the yoke 41 mounted for guided longitudinal movement upon the guide member 42.

This yoke is actuated longitudinally by means of the bell crank lever 43 which is similar in function to the bell crank 36. The bell crank 43 is provided at each end with lost motion connections 44 to permit the relative angular movement of the bell crank while allowing longitudinal actuation.

The sleeve 39 is formed with the rack sections 45. As shown in Figure 6, this is a single rack having four operative sections coacting respectively with the pinions 46 keyed to one end of the screw threaded bolts 47. The bolts 47, as will be noted in Figure 5, are received within corresponding internal threads on the masses 28. The pitch of the threads are chosen so as to provide for radial movement of the masses 28 upon rotation of the screws 47. Obviously, in lieu of the four rack-ways and pinions shown, any desired number may be employed. The number used will correspond to the number of separate masses 28.

The operation of this form of the device is comparable to that already described. As the carriage 2 is displaced downwardly, bell crank lever 43 will be moved about its pivot to effect longitudinal displacement of the sleeve 39. The resulting movement of the racks 45 will effect rotation of the screws 47 and move the masses 28 radially outwardly to an extent proportional to the downward displacement of the car. Thereafter the wheel rotating rollers may be driven against resistance of its brake, by operating the motor and transmitting motion from the motor shaft through the universal joints and telescopic connection.

It will be appreciated from the description and the two typifying devices, that the invention is susceptible of wide range of modification and design and hence it is not intended to be limited to the particular devices shown and described as the invention is considered to reside broadly in the concept of automatic adjustment of the brake testing unit to simulate the road conditions of momentum.

I claim:

1. A brake testing apparatus comprising a carriage displaceable proportional to a load imposed thereon, wheel supporting rotating means mounted on the carriage, an adjustable inertia body of variable inertia connected with the wheel rotating means and connections from the carriage to the body operated by displacement to the carriage to vary the degree of inertia of the body.

2. A brake testing apparatus comprising a carriage displaceable proportional to a load imposed thereon, wheel supporting rotating means mounted on the carriage, a motor connected to and operating the wheel rotating means, an adjustable inertia body of variable inertia interposed in the driving connection and means connecting the inertia body and the carriage and operable upon displacement of the latter to vary the inertia of the body.

3. A brake testing device comprising a carriage displaceable proportional to a load imposed thereon, wheel supporting rotating means on the carriage, means to drive the wheel rotating means, an inertia body connected with the wheel rotating means including means to vary the inertia thereof, and means operable by displacement of the carriage to vary the inertia of the inertia body.

4. A brake testing device comprising a wheel supporting rotating means displaceable proportional to a load imposed thereon, an adjustable inertia body connected with the wheel rotating means, and means operated by the displacement of the supporting means due to the weight of the load on the supporting means to vary the inertia effect of the inertia body upon the wheel rotating means.

5. A brake testing apparatus comprising a carriage displaceable proportional to a load imposed thereon, wheel supporting rotating means mounted on the carriage, a motor connected to and operating the wheel rotating means, an adjustable inertia body interposed in the driving connection, said body having radially movable weights, and connections from the displaceable carriage to the weights for moving said weights radially.

6. A brake testing apparatus comprising a frame, supporting means mounted thereon to receive the vehicle wheels and for turning one or more of the vehicle wheels against the resistance of its brake, said frame and/or wheel supporting means being mounted for displacement proportional to the weight of the vehicle being supported, an inertia body including one or more members adjustable to vary the inertia of said body, said body being associated with said wheel supporting means, and means responsive to the displacement due to the vehicle weight for effecting adjustment of the inertia body.

7. A brake testing apparatus comprising means for supporting and for turning the wheels of a vehicle against the resistance of their brakes including means displaceable to an extent proportional to the weight of the supported vehicle, a rotatable fly wheel associated with said wheel turning means and having an adjustable part for varying the inertia of said wheel, and means actuated by said displaceable means for varying the adjustment of said inertia wheel.

HARRY H. SEMMES.